Patented Sept. 19, 1950

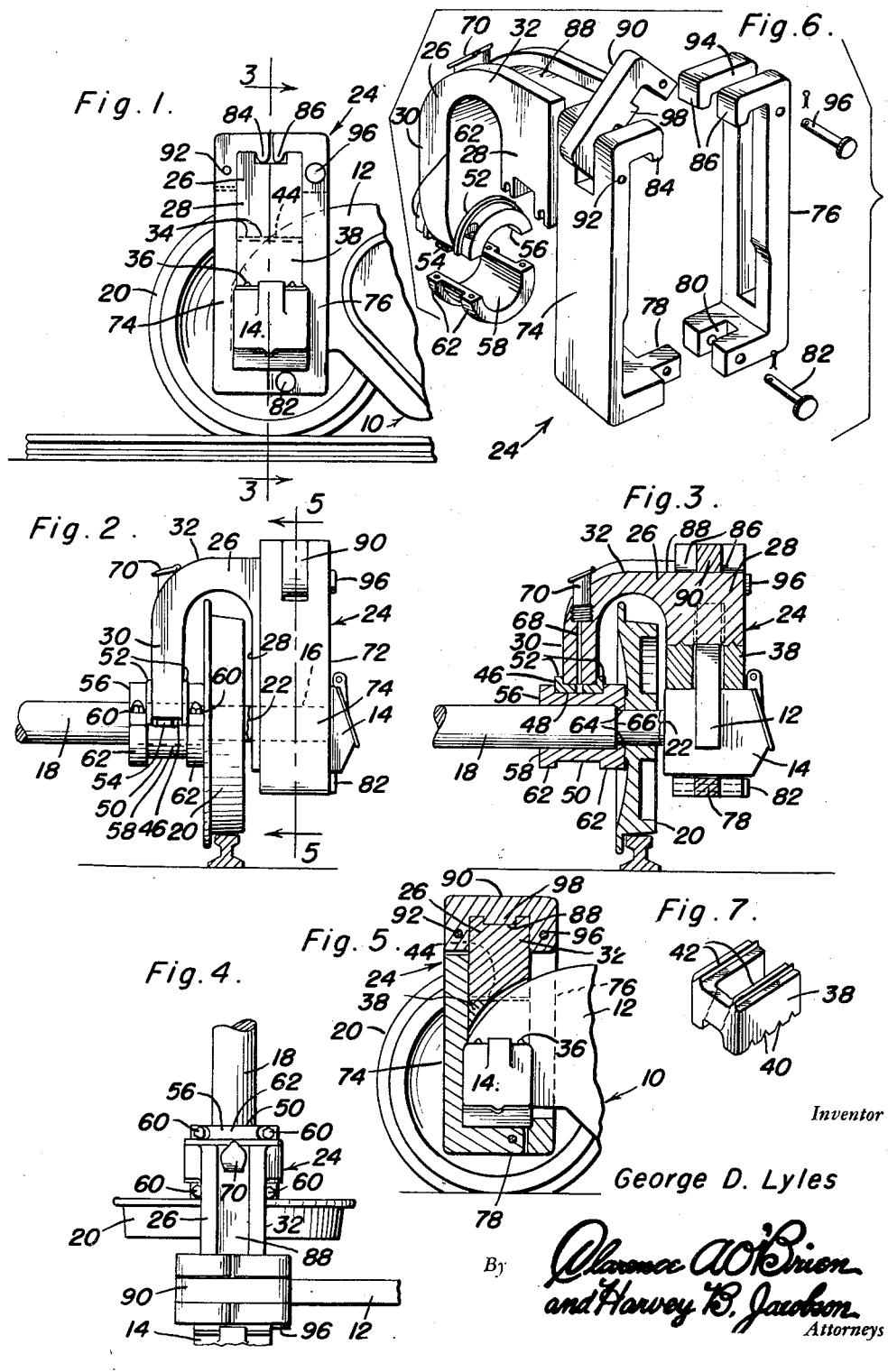

2,522,626

UNITED STATES PATENT OFFICE 2,522,626

EMERGENCY CARRIER FOR RAILROAD TRUCK AXLES

George D. Lyles, Tullahoma, Tenn.

Application November 10, 1948, Serial No. 59,333

7 Claims. (Cl. 105—217)

This invention relates to new and useful improvements and structural refinements in emergency apparatus for facilitating temporary operation of railroad rolling stock, and the principal object of the invention is to provide a temporary repair means for truck axles having broken journals, so that the coach or freight car, or the like, having a damaged truck may be conveniently, expeditiously and safely transported to the repair shop.

This object is achieved by the provision of what may be referred to as an emergency carrier which is securely attachable to the journal box and rotatably supports the broken axle notwithstanding the fact that the standard journal has been broken away from the axle, and an important feature of the invention involves the provision of means for securely and expeditiously attaching the carrier to the journal box, whereby the emergency repair operation may be effected in a very short time and with the expenditure of the minimum amount of labor.

Another feature of the invention involves the provision of a bearing on the emergency carrier for the purpose of rotatably and supportably engaging the broken axle, this being accomplished in such manner that the broken axle may rotate freely and in substantial axial alignment with the broken journal, as though the broken journal were intact and supported by the journal box.

An additional feature of the invention resides in the provision of means whereby the emergency carrier may be readily adapted to accommodate railroad trucks of various types and journal boxes of various sizes.

Some of the advantages of the invention lie in its simplicity of construction and in its adaptability to economical manufacture.

With the above more important objects and features in view and such other objects and features as may become apparent as this specification proceeds, the invention consists essentially in the arrangement and construction of parts as illustrated in the accompanying drawings, in which:

Figure 1 is a fragmentary side elevational view showing a railroad truck including a journal box and wheel, and illustrating the invention in situ thereon;

Figure 2 is a fragmentary end view of the subject shown in Figure 1;

Figure 3 is a cross-sectional view taken substantially in the plane of the line 3—3 of Figure 1;

Figure 4 is a fragmentary top plan view of the subject shown in Figures 1 and 2;

Figure 5 is a cross-sectional view, taken substantially in the plane of the line 5—5 of Figure 2;

Figure 6 is a group perspective view of the invention per se; and

Figure 7 is a perspective view of a shim used in the invention.

Like characters of reference are employed to designate like parts in the specification and throughout the several views.

Referring now to the accompanying drawings in detail, the general reference character 10 designates a railroad truck of any conventional type, the same including a side frame 12 carrying a journal box 14, the latter providing a bearing for the journal 16 (see Figure 2) of an axle 18 on which, in turn, is mounted a wheel 20.

The instant invention is intended to be used in this environment under conditions where the journal 16 has broken away from the axle 18 as indicated by the break lines 22 in Figures 2 and 3, the invention consisting of what may be referred to as an emergency carrier designated generally by the reference character 24, the construction of which will now be described.

The carrier 24 embodies an inverted J-shaped support member 26 including a relatively short arm or outer portion 28, a relatively long arm or inner portion 30 and an arcuate bight portion 32 which connects the arms 26, 28 together, substantially as shown.

It is to be noted that when the support member 26 is installed, it is positioned so that it straddles, so to speak, the wheel 20 and the side frame 12, with the short arm 28 of the member being disposed exteriorly and the long arm 30 being disposed interiorly, substantially as shown in the accompanying drawing.

The lower end portion or surface of the short arm 28 of the member 26 is provided with a set of spaced notches 34 which are adapted to engage upwardly projecting ribs 36 usually provided on the journal box 14, whereby the entire support member 26 is carried by the journal box. However, in order to compensate for varying dimensions of journal boxes, such as are commonly in use, a suitable shim 38 may be interposed between the journal box and the lower end portion of the support member arm 28, substantially as shown. This shim, which may be of any desired thickness, is preferably U-shaped in configuration, as is best shown in Figure 7, whereby it may straddle an end portion of the truck side frame 12 when it is inserted between the journal box 14 and the support member arm 28 in a lateral direction. The lower surface of the shim 38 may be formed with a set of notches 40, similar to the aforementioned notches 34, whereby the shim may be supportably engaged by the ribs 36 on the journal box. Moreover, the upper surface of the shim 38 may be provided with a pair of longitudinally extending ribs 42 which may engage longitudinally extending grooves or channels 44 provided in the lower end of the support member arm 28 in intersecting relation with the notches 34, whereby any possible displacement of the shim is prevented.

The relatively long arm 30 of the support member 26 is provided at its lower end with a bearing unit 46 consisting of two primary parts, namely, a bearing insert 48 and the bearing proper 50. The bearing insert 46 is substantially semi-circular in configuration, and is inserted in a semi-circular recess provided in the lower portion of the support member arm 30. It is to be noted that the bearing insert 48 is equipped with a pair of side flanges 52 which prevent longitudinal shifting thereof with respect to the arm 30, while any tendency for the insert to rotate in its recess in the arm 30 is prevented by a pair of laterally projecting ears 54 with which the insert is provided.

The bearing proper 50 is preferably composed of two complementary semi-cylindrical sections 56, 58 which are clamped on the axle 18 immediately adjacent the wheel 20 by means of suitable bolts 60. The bearing proper 50 is supportably and rotatably engaged by the bearing insert 48 in such manner that the intermediate portion of the broken axle 18 is substantially coaxial with the broken journal thereof (16) in the journal box 14. The utility of the shim 38 will be clearly apparent at this point, the shim being necessary, of course, to assure proper alignment of the axle shaft 18 with respect to the journal box 14.

It is to be noted that the bearing sections 56, 58 are provided at the ends thereof with outturned flanges 62 between which the bearing insert 48 is disposed, whereby longitudinal shifting of the entire support member 26 relative to the axle 18 is prevented. Moreover, the bearing sections 56, 58 may be formed at one end with inturned flanges or shoulders 64 (see Figure 3) to engage a machined portion or shoulder 66 usually formed on the axle 18 adjacent the wheel 20, in order to further safeguard against the possibility of longitudinal shifting of the support member on the axle.

The arm portion 30 of the support member 26 and the insert 48 may be formed with aligned passages indicated at 68 in Figure 3, and the support member itself may be equipped with a suitable lubricant fitting 70 in communication with these passages, whereby suitable lubricant may be applied to the insert 48 and the bearing proper 50, as will be clearly apparent.

Means are provided for securely clamping the support member 26 to the journal box 14, these means consisting of a releasable clamp unit 72 consisting of two complementary sections 74, 76, these being configurated as is best shown in Figure 6 and being substantially U-shaped, as illustrated. The bottom angulated portion of the clamp section 74 is provided with a tongue 78 which is receivable in a recess 80 formed in the bottom angulated portion of the clamp section 76, a removable locking pin 82 being provided in these interfitting elements for the purpose of releasably or separably securing the same together under the journal box 14. On the other hand, the upper angulated portions of the clamp sections 74, 76 are equipped with pairs of downturned, hook-shaped keepers 84, 86, respectively, which are removably receivable in a groove or keeper seat 88 formed in the bight portion 32 of the support member 26, substantially as shown. Moreover, a tongue 90 is pivotally attached, as at 92, to the upper end portion of the clamp section 74 and is receivable in a recess 94 provided in the upper end portion of the clamp section 76, a further locking pin 96 being employed for separably connecting the tongue 90 to the clamp section 76, as will be readily understood. It is to be noted, however, that the tongue 90 is provided with a downwardly projecting detent 98 which is receivable in the keeper seat 88 of the support member 26 when the two clamp sections 74, 76 are connected together by the tongue, this arrangement being best shown in Figure 5.

As a result, when the clamp members 74, 76 are applied to the short arm 28 of the support member 26 and to the journal box 14, the support member and the journal box will be firmly and securely held together, and by virtue of the bearing 46, the axle 18 will be effectively supported in its normal, proper alignment, notwithstanding the breakage of the journal indicated at 22. This temporary carrying arrangement will facilitate convenient and expeditious transportation of the coach or car equipped with the damage truck to a repair shop, and it is to be noted that the invention will function effectively on trucks having journal boxes rigidly secured to the side frames as well as on trucks wherein the journal boxes are resiliently mounted in the side frames, such as for example, on some passenger coaches. In the latter instance, sufficient clearance is provided in the short arm 28 of the support member 32 to permit the journal box and the support member to rise and fall under control of the associated journal box springs (not shown) without interfering with the side frame or the wheel 20.

It is believed that the advantages and use of the invention will be clearly understood from the foregoing disclosure, and accordingly, further description thereof at this point is deemed unnecessary.

Having described the invention, what is claimed as new is:

1. For use on a railroad truck having a journal box and a broken axle including an intermediate portion and a journal disposed in said box and severed from said intermediate portion, an emergency carrier comprising a support member secured to said journal box, and a bearing provided on said support member, the intermediate portion of said axle being rotatable in said bearing, whereby load on the journal box may be transferred to said intermediate portion and the latter sustained in substantial axial alignment with the severed journal.

2. The device as defined in claim 1 together with releasable clamp means for securing said support member to the journal box.

3. For use on a railroad truck having a side frame provided with a journal box, a broken axle including an intermediate portion and a journal disposed in said box and severed from said intermediate portion, and a wheel on the intermediate portion of said axle, an emergency carrier comprising an inverted J-shaped support member extending over said wheel and side frame and having inner and outer portions disposed at the respective inner and outer sides of said wheel, a releasable clamp provided on the outer portion of said member and securing the same to the journal box, and a bearing provided at the lower end of the inner portion of said member, the intermediate portion of said axle being rotatable in said bearing, whereby load on the journal box may be transferred to the wheel and the intermediate portion of the axle sustained in substantial axial alignment with the severed journal.

4. The device as defined in claim 3 wherein said bearing includes a plurality of complemental bearing sections clamped to the intermediate portion of said axle, the lower end of the inner portion of said support member being provided with a semi-circular recess to rotatably receive said bearing sections.

5. The device as defined in claim 4 wherein said bearing sections are provided at the opposite ends thereof with outturned flanges, the recessed lower end of the inner portion of said support member being seated on said bearing sections between said flanges, whereby to prevent longitudinal shifting of the support member on said axle.

6. The device as defined in claim 3 wherein said clamp includes a pair of complemental clamp sections embracing the journal box and the outer portion of said support member, said clamp sections having interfitted portions, and removable fastening elements extending through the interfitted portions of the two clamp sections and securing the same together.

7. The device as defined in claim 6 wherein said support member includes a bight portion provided with a keeper seat, together with hook-shaped keepers provided on said clamp sections and extending into said seat.

GEORGE D. LYLES.

REFERENCES CITED

The following references are of record in the file of this patent:

UNITED STATES PATENTS

| Number | Name | Date |
| --- | --- | --- |
| 1,035,018 | Krause | Aug. 6, 1912 |
| 1,394,318 | McGuire | Oct. 18, 1921 |